UNITED STATES PATENT OFFICE.

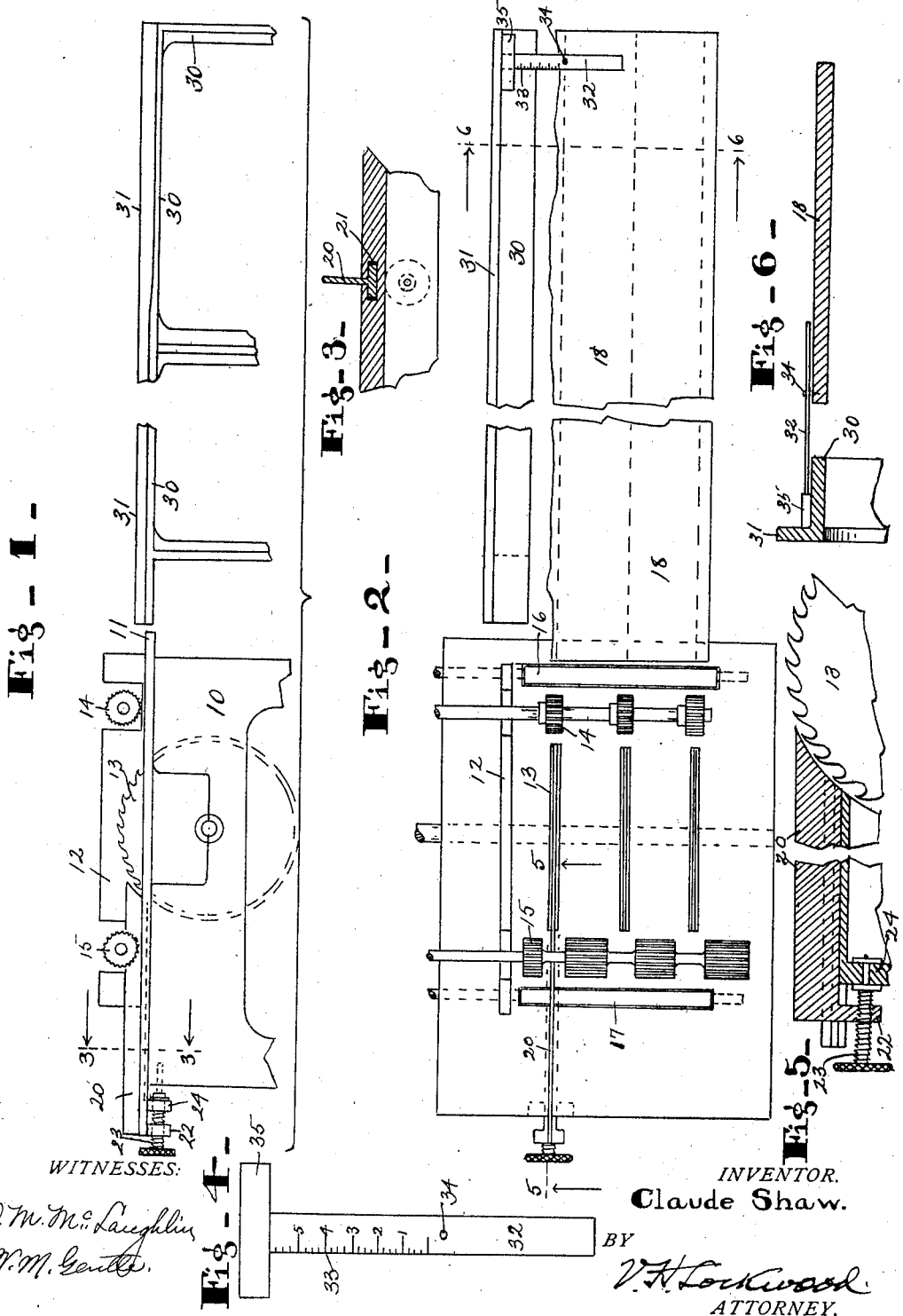

CLAUDE SHAW, OF INDIANAPOLIS, INDIANA, ASSIGNOR OF ONE-HALF TO THE AMERICAN BOX BALL CO., OF INDIANAPOLIS, INDIANA, A CORPORATION OF INDIANA.

RIP-SAW MACHINE.

1,038,215.  Specification of Letters Patent.  Patented Sept. 10, 1912.

Application filed December 2, 1909. Serial No. 531,023.

*To all whom it may concern:*

Be it known that I, CLAUDE SHAW, of Indianapolis, county of Marion, and State of Indiana, have invented a certain new and useful Rip-Saw Machine; and I do hereby declare that the following is a full, clear, and exact description thereof, reference being had to the accompanying drawings.

The object of this invention is to improve the construction of self-feed rip-saw mechanism so as to conveniently saw a board or material with a straight edge. There is a tendency of the saw to be affected by the grain of the wood and to some extent follow the grain of the wood, and, therefore, it has been difficult to saw planks or boards with a straight edge when fed past a rip-saw. It is important in the manufacture of many articles that the lumber should have a true, straight edge, and by providing means for giving the plank one straight edge at the beginning of the sawing thereof, the remaining boards split from the plank will all have straight edges.

The chief feature of the invention consists in providing means for guiding both ends of the boards to be sawed. The guide at the rear end of the board holds the board in true alinement while the saw and a guide is at the front end of the board. Without this double guide at both ends of the boards, it is practically impossible to get the edge truly straight.

The nature of the invention will be understood from the accompanying drawings and the following description and claims:

In the drawings Figure 1 is a side elevation of the upper part of the mechanism, parts being centrally broken away. Fig. 2 is a plan view thereof with a board ready to start through the rip-saw. Fig. 3 is a section on the line 3—3 of Fig. 1. Fig. 4 is a plan view of the gage at the rear end of the board to be sawed. Fig. 5 is a section on the line 5—5 of Fig. 2, and Fig. 6 is a section on the line 6—6 of Fig. 2.

There is shown herein a frame 10 of a self-feed rip-saw machine, with a top 11 and the usual primary fence or guide 12, saws 13, and feed rolls 14 and 15, driven by suitable means not here shown. In the top 11 there are rolls 16 and 17 over which the board 18 that is to be sawed moves.

The foregoing mechanism is old so far as this invention is concerned, and the parts thereof may be constructed in any of the usual forms. In operating such old form of rip saw machine, the edge of the board is placed against the guide 12, and if the edge of the board at the beginning were not straight, the strip ripped from the board would not have straight edges. I provide a secondary fence or guide 20 that is parallel with the primary fence 12 and in alinement with one of the saws. As indicated in Fig. 3, this secondary guide or fence may be flanged along the lower edge to fit in a corresponding groove 21 in the table 11 so as to be longitudinally adjustable toward and from the saw, and thus adapted to be used in connection with saws of various diameters, for it is desirable that the guide or fence project as closely to the saw as possible. For adjusting the secondary fence or guide 20 I provide a downwardly extending screw-threaded arm 22, through which a screw 23 operates, said screw being mounted in a boss 24 on the table so as to have rotary but not longitudinal movement, see Fig. 5.

The means for guiding the rear end of the board 18 consists of the following: There is a frame 30 that is positioned with certain relation to the frame of the rip-saw, and may be connected with it or not, as that is immaterial and is shown here separated. The upper part may consist of nothing but an angle bar, but it must have a longitudinal guide bar 31 parallel with lines running longitudinally through the guides or fences 12 and 20. The operator places the forward end of the board upon the table 11 of the rip-saw, substantially in the position that he wishes for it to approach the saws, and upon the rear end of the board he places the gage 32, which has a graduated scale 33, in inches, a pin 34 adapted to enter the board 18, and a head 35 adapted to slip along the side of the guide 31. The inch scale indicates the distance that the guide 31 is from the plane of the first saw 13, so that by placing the gage on the board with the pin 34 penetrating it somewhat and moving the board toward the guide 31 until the head 35 of the gage abuts against the guide 31, the pin 34 will be in exact alinement with the first saw. The board is then pushed under the feeding mechanism of the rip-saw and fed past the saws while the operator holds the rear end and forces it forwardly, at all times holding the gage on the board and with the head of it against the guide 31. This will insure that the first saw 13 will cut an absolutely straight edge even before the advancing end of the board reaches the guide 20. After the advancing end of the board reaches the guide 20, the two separated parts of the board pass one on each side of said guide, so that the guide 20 from that time on will facilitate the guiding of the board, it guiding the front end of the board while the gage 32 and guide bar 31 will guide the rear end of the board. After the advance end of the board has passed beyond the guide 20, said guide 20 will almost suffice to entirely guide the board during the further sawing thereof, and especially after the rear end of the board has passed away from the guide bar 31.

The means for guiding the rear ends of the boards is not in the way of the use of the main part of the rip-saw machine when it is used for other than joining purposes, or ripping straight-edged strips to be secured adjacent each other. The guiding means 31 is not in the way of the person operating the main part of the machine. When it is desired to make a joining saw of it, all the operator needs to do is to pick up the gage 32 and apply it to the lumber to be sawed, and at other times the guides 30 and 31 are not used and are not in the way of the use of the machine for other purposes.

What I claim as my invention and desire to secure by Letters Patent is:

In a rip-saw machine including a saw and feed mechanism preceding the same, a stationary guide arranged in advance of the feed mechanism and at one side of but parallel to the plane of the saw, a transversely-disposed gage coöperating with said guide and adapted to abut against and travel along the same, and means for temporarily engaging the gage with the rear end of a board as it is being fed to the saw to preserve the line of feed of the board with respect to the saw.

In witness whereof, I have hereunto affixed my signature in the presence of the witnesses herein named.

CLAUDE SHAW.

Witnesses:
G. H. BOINK,
O. M. McLAUGHLIN.

---

Copies of this patent may be obtained for five cents each, by addressing the "Commissioner of Patents, Washington, D. C."